(12) United States Patent
Feuersänger et al.

(10) Patent No.: US 8,489,953 B2
(45) Date of Patent: Jul. 16, 2013

(54) HARQ PROCESS MANAGEMENT (75) Inventors: Martin Feuersänger, Langen (DE);
Joachim Löhr, Langen (DE); Christian Wengerter, Langen (DE)

(73) Assignee: Panasonic Corporation, Osaka (JP)

( * ) Notice: Subject to any disclaimer, the term of this patent is extended or adjusted under 35 U.S.C. 154(b) by 273 days.

(21) Appl. No.: 12/922,631

(22) PCT Filed: Mar. 16, 2009

(86) PCT No.: PCT/EP2009/001894
§ 371 (c)(1),
(2), (4) Date: Oct. 5, 2010

(87) PCT Pub. No.: WO2009/115261
PCT Pub. Date: Sep. 24, 2009

(65) Prior Publication Data
US 2011/0047430 A1 Feb. 24, 2011

(30) Foreign Application Priority Data
Mar. 17, 2008 (EP) ...................................... 08004953

(51) Int. Cl.
*H04L 1/18* (2006.01)
*H03M 13/00* (2006.01)
(52) U.S. Cl.
USPC ........................................................ 714/751
(58) Field of Classification Search
USPC .................................. 714/748–751
See application file for complete search history.

(56) References Cited

U.S. PATENT DOCUMENTS

| 6,477,143 B1 * | 11/2002 | Ginossar | 370/230 |
| 2003/0152058 A1 * | 8/2003 | Cimini et al. | 370/338 |
| 2009/0055919 A1 * | 2/2009 | Komura et al. | 726/11 |

FOREIGN PATENT DOCUMENTS

| EP | 1 389 847 | 2/2004 |
| EP | 1 901 471 | 3/2008 |
| WO | 03/096298 | 11/2003 |

OTHER PUBLICATIONS

International Search Report dated Jun. 17, 2009.

* cited by examiner

*Primary Examiner* — Guy Lamarre
(74) *Attorney, Agent, or Firm* — Dickinson Wright PLLC (57) ABSTRACT

The invention relates to a method for receiving data units when using one HARQ process of an HARQ protocol. The memory associated to the HARQ process is divided into several sub-areas, which are addressable by an identifier. Then, when data is received, same is stored in one of the sub-areas. By providing more than one sub-area for one HARQ process, it is possible to actually use one HARQ process for two (or more) different received data units, being from the same data flow or from a different data flow. The actual sub-area of the HARQ process for storing data units can be either freely selected at the receiving end or is indicated by an identifier associated with the data. Furthermore, persistent scheduled data is transmitted in units, scheduled at fixed time intervals. Thus, a control signaling field, usually used for indicating new units, can be used to store the identifier.

20 Claims, 4 Drawing Sheets

| HARQ process ID 1 | HARQ process ID 2 | HARQ process ID 3 | HARQ process ID 4 | HARQ process ID 5 | HARQ process ID 6 | HARQ process ID 7 | HARQ process ID 8 |

Fig. 4 area0

| HARQ process ID 1 | HARQ process ID 2 | HARQ process ID 3 | HARQ process ID 4 | HARQ process ID 5 | HARQ process ID 6 | HARQ process ID 7 | HARQ process ID 8 | area1

HARQ PROCESS MANAGEMENT

FIELD OF THE INVENTION

The invention relates to a method for receiving and transmitting protocol data units when using an HARQ re-transmission protocol. Furthermore, the invention relates to a mobile terminal and a radio control entity in a mobile communications system that participate in the invention.

TECHNICAL BACKGROUND

W-CDMA (Wideband Code Division Multiple Access) is a radio interface for IMT-2000 systems (International Mobile Telecommunication system), which was standardized for use as the 3rd generation wireless mobile telecommunication system. It provides a variety of services such as voice services and multimedia mobile communication services in a flexible and efficient way. The standardization bodies in Japan, Europe, USA and other countries have jointly organized a project called the 3rd Generation Partnership Project (3GPP) to produce common radio interface specifications for W-CDMA.

The standardized European version of IMT-2000 is commonly called UMTS (Universal Mobile Telecommunication System). The first release of the specification of UMTS has been published in 1999 (Release 99). In the mean time several improvements to the standard have been standardized by the 3GPP in Release 4, Release 5 and Release 6.

A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

However, knowing that user and operator requirements and expectations will continue to evolve, the 3GPP has begun considering the next major step or evolution of the 3G standard to ensure the long-term competitiveness of 3G.

The 3GPP recently launched a study item "Evolved UTRA and UTRAN" better known as "Long Term Evolution (LTE)". The study will investigate means of achieving major leaps in performance in order to improve service provisioning, and to reduce user and operator costs. It is generally assumed that Internet Protocols (IP) will be used in mobility control, and that all future services will be IP-based. Therefore, the focus of the evolution is on enhancements to the packet-switched (PS) domain of legacy UMTS systems.

The main objectives of the evolution are to further improve service provisioning, and reduce user and operator costs, as already mentioned. More specifically, some key performance, capability and deployment requirements for the long-term evolution (LTE) are inter alia:

significantly higher data rates compared to HSDPA and HSUPA (envisioned are target peak data rates of more than 100 Mbps over the downlink and 50 Mbps over the uplink),
Mean user throughput improved by factors 2 and 3 for respectively uplink (UL) and downlink (DL),
high data rates with wide-area coverage,
cell-edge user throughput improved by a factor 2 for uplink and downlink,
uplink and downlink spectrum efficiency respectively improved by factors 2 and 3,
significantly reduced latency in the user plane in the interest of improving the performance of higher layer protocols (for example, TCP) as well as reducing the delay associated with control plane procedures (for instance, session setup), and
stand-alone system operation in spectrum allocations of different sizes ranging from 1.25 MHz to 20 MHz.

One other deployment-related requirement for the long-term evolution study is to allow for a smooth migration to these technologies.

The ability to provide high bit rates is a key measure for LTE. Multiple parallel data stream transmission to a single terminal, using multiple-input-multiple-output (MIMO) techniques, is one important component to reach this. Larger transmission bandwidth and at the same time flexible spectrum allocation are other pieces to consider when deciding what radio access technique to use. The choice of adaptive multi-layer OFDM (Orthogonal Frequency Division Multiplexing), Adaptive Multi Layer (AML)-OFDM, in downlink will not only facilitate to operate at different bandwidths in general but also large bandwidths for high data rates in particular. Varying spectrum allocations, ranging from 1.25 MHz to 20 MHz, are supported by allocating corresponding numbers of AML-OFDM subcarriers. Operation in both paired and unpaired spectrum is possible as both time-division and frequency-division duplex is supported by AML-OFDM.

OFDM with Frequency-Domain Adaptation

The AML-OFDM-based downlink has a frequency structure based on a large number of individual sub-carriers with a spacing of 15 kHz. This frequency granularity facilitates to implement dual-mode UTRA/E-UTRA terminals. The ability to reach high bit rates is highly dependent on short delays in the system and a prerequisite for this is short sub-frame duration. Consequently, the LTE sub-frame duration is set as short as 1 ms in order to minimize the radio-interface latency. In order to handle different delay spreads and corresponding cell sizes with a modest overhead, the OFDM cyclic prefix length can assume two different values. The shorter 4.7 ms cyclic prefix is enough to handle the delay spread for most unicast scenarios. With the longer cyclic prefix of 16.7 ms very large cells, up to and exceeding 120 km cell radiuses, with large amounts of time dispersion can be handled. In this case, the length is extended by reducing the number of OFDM symbols in a sub-frame.

The basic principle of Orthogonal Frequency Division Multiplexing (OFDM) is to split the frequency band into a number of narrowband channels. Therefore, OFDM allows transmitting data on relatively flat parallel channels (subcarriers) even if the channel of the whole frequency band is frequency selective due to a multipath environment. Since the subcarriers experience different channel states, the capacities of the subcarriers may vary and permit a transmission on each subcarrier with a distinct data-rate. Hence, subcarrier wise (frequency domain) Link Adaptation (LA) by means of Adaptive Modulation and Coding (AMC) increases the radio efficiency by transmitting different data-rates over the subcarriers.

OFDMA allows multiple users to transmit simultaneously on the different subcarriers per OFDM symbol. Since the probability that all users experience a deep fade in a particular subcarrier is very low, it can be assured that subcarriers are assigned to the users who see good channel gains on the corresponding sub-carriers. When allocating resources in the downlink to different users in a cell, the scheduler takes information on the channel status experienced by the users for the subcarriers into account. The control information signaled by the users, i.e. CQI, allows the scheduler to exploit the multi-user diversity, thereby increasing the spectral efficiency.

LTE Architecture

Figure 1:
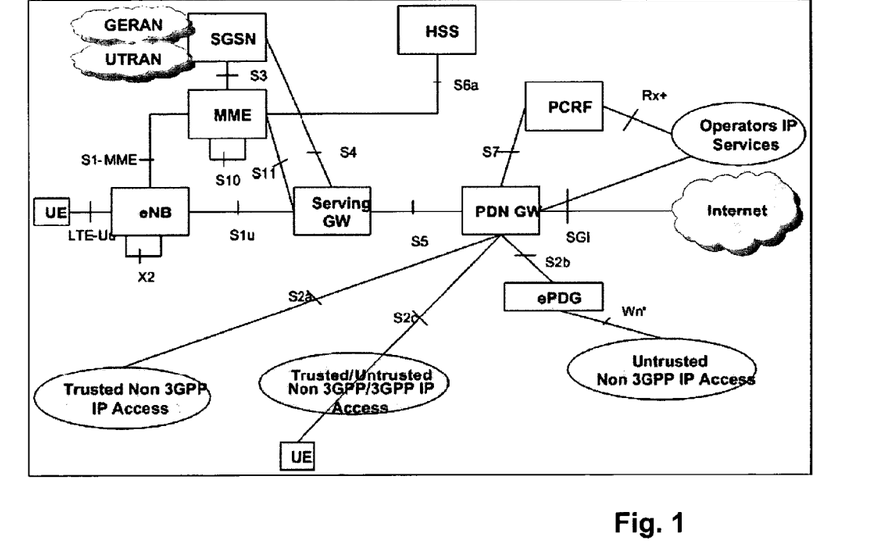
FIG. 1 illustrates the high-level architecture of an LTE system.
Figure 2:
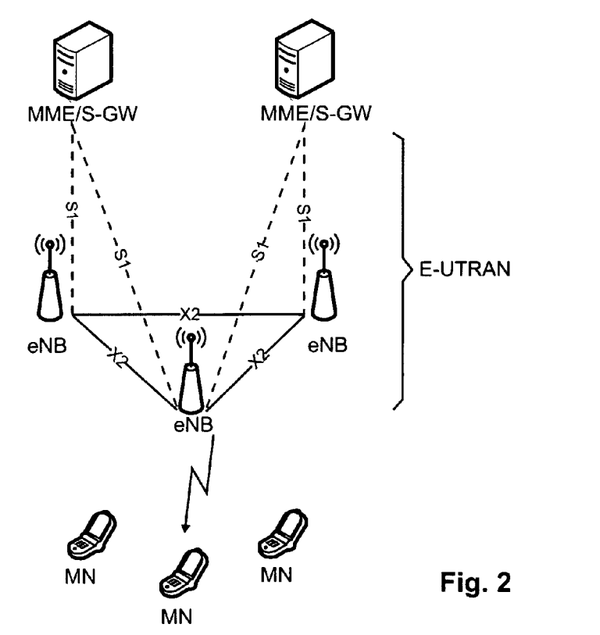
FIG. 2 illustrates the overall E-UTRAN architecture.

The overall architecture is shown in FIG. 1 and a more detailed representation of the E-UTRAN architecture is given in FIG. 2. The E-UTRAN consists of evolved Node Bs (eNB), providing the E-UTRA user plane (PDCP/RLC/MAC/PHY) and control plane (RRC) protocol terminations towards the mobile node (referred to in the following as UE or MN).

The eNB hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. Further, it performs many functions including radio resource management, admission control, scheduling, enforcement of negotiated UL-QoS (Quality of Service), cell information broadcast, ciphering/deciphering of user and control plane data, and compression/decompression of DL/UL user plane packet headers. The eNBs are interconnected with each other by means of the X2 interface. The eNBs are also connected by means of the S1 interface to the EPC (Evolved Packet Core), more specifically to the MME (Mobility Management Entity) by means of the S1-MME, and to the Serving Gateway (S-GW) by means of the S1-U. The S1 interface supports a many-to-many relation between MMEs/Serving Gateways and eNBs.

The S-GW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and Packet Data Network Gateway). For idle state UEs, the S-GW terminates the DL data path and triggers paging when DL data arrives for the UE. It manages and stores UE contexts, e.g. parameters of the IP bearer service, network internal routing information. It also performs replication of the user traffic in case of lawful interception.

The MME is the key control-node for the LTE access-network. It is responsible for idle mode UE tracking and paging procedure including retransmissions. It is involved in the bearer activation/deactivation process and is also responsible for choosing the S-GW for a UE at the initial attach and at time of intra-LTE handover involving Core Network (CN) node relocation. It is responsible for authenticating the user (by interacting with the Home Subscriber Server, HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming UEs.

Hybrid ARQ Schemes

A common technique for error detection and correction in packet transmission systems over unreliable channels is called Hybrid Automatic Repeat reQuest (HARQ). Hybrid ARQ is a combination of Forward Error Correction (FEC) and ARQ.

Automatic Repeat-reQuest (ARQ) is an error control method for data transmission which uses acknowledgments and timeouts to achieve reliable data transmissions. An acknowledgment is a message sent by the receiver to the transmitter to indicate that it has correctly received a data packet. If the sender does not receive an acknowledgment before the timeout, being a reasonable time interval for receiving an acknowledgment, it usually re-transmits the frame until it receives an acknowledgment or exceeds a predefined number of re-transmissions.

Forward error correction is employed to control errors in data transmissions, wherein the sender adds redundant data to its messages. This enables the receiver to detect whether an error has occurred, and further allows to correct some errors without requesting additional data from the sender. Consequently, since within a certain limit FEC allows to correct some of the errors, re-transmission of data packets can often be avoided. However, due to the additional data that is appended to each data packet, this comes at the cost of higher bandwidth requirements.

If a FEC encoded packet is transmitted and the receiver fails to decode the packet correctly (errors are usually checked by a CRC (Cyclic Redundancy Check)), the receiver requests a re-transmission of the packet.

Depending on the information (generally code bits/symbols) of which the transmission is composed of, and depending on how the receiver processes the information, the following hybrid ARQ schemes are defined:

Type I: The error detection information (such as CRC) is added to the data packet, which is then encoded with a forward error correction code (such as Reed-Solomon code or Turbo code). In the receiver the FEC code is decoded and the quality of the packet is determined. If the channel quality is good enough, all transmission errors should be correctable, and the receiver can decode the actual data packet correctly. If the channel quality is bad and not all transmission errors can be corrected, then the received coded data packet is discarded and a re-transmission for said data packet is requested by the receiver. In this type of HARQ the re-transmission uses the same FEC code as during the initial transmission. Further, the re-transmission data packets contain identical information (code bits/symbols) to the initial transmission. Resulting from the above, the received transmissions are all decoded separately in the receiver.

Type II: According to the second type of HARQ, if the receiver fails to decode a packet correctly, the receiver stores the information of the (erroneously received) encoded packet as soft information (soft bits/symbols) and a re-transmission is requested from the sender. This implies that a soft-buffer is required at the receiver. Re-transmissions can be composed out of identical, partly-identical or non-identical information (code bits/symbols) compared to the initially transmitted data packet. When receiving a re-transmission, the receiver combines the stored information from the soft buffer and the currently received information and tries to decode the packet based on the combined information. The combining of transmissions refers to so called soft-combining, where multiple received code bits/symbols are likelihood combined and solely received code bits/symbols are code combined. Common methods for soft-combining are Maximum Ratio Combining (MRC) of received modulation symbols and log-likelihood ratio (LLR) combining (LLR combining only works for code bits). Type II HARQ schemes are more sophisticated than Type I HARQ schemes, since the probability for a correct reception of a data packet increases with each received re-transmission. This increase comes at the cost of a HARQ soft-buffer at the receiver.

The Type II HARQ scheme can be used to perform dynamic link adaptation by controlling the amount of information to be re-transmitted. E.g. if the receiver detects that decoding has been almost successful, it can request only a small piece of information for the next re-transmission (smaller number of code bits/symbols than in the previous transmission) to be transmitted. In this case it might happen that it is even theoretically not possible to correctly decode the re-transmission packet by itself, wherein this is referred to as non-self-decodable re-transmissions.

Type III: This is a subset of the Type II HARQ with the restriction that each transmission, be it an initial or a re-transmission, must be self decodable.

The HARQ mechanism has been defined for unicast data transmissions, wherein there are two levels of re-transmissions for providing reliability, namely, the Hybrid Automatic Repeat reQuest (HARQ) at the MAC layer and the outer ARQ at the RLC layer.

L1/2 Control Signaling

In order to provide sufficient side information to correctly receive or transmit data in systems employing packet scheduling, so-called L1/L2 control signaling needs to be transmitted. The scheduled users need to be informed about their allocation status, transport format and other data related information (e.g. Hybrid ARQ (Automatic Repeat-reQuest)), using the L1/L2 control signaling transmitted on the downlink along with the data. The control signaling needs to be multiplexed with the downlink data in a sub frame (assuming that the user allocation can change from sub frame to sub frame). Here, it should be noted, that user allocation might also be performed on a TTI (Transmission Time Interval) basis, where the TTI length is a multiple of the sub frames. The TTI length may be fixed in a service area for all users, may be different for different users, or may even by dynamic for each user. Generally, the L1/2 control signaling then needs only to be transmitted once per TTI. However, in some cases it may make sense to repeat the L1/2 control signaling within a TTI in order to increase reliability.

Typical operation mechanisms for downlink and uplink data transmission when employing ARQ schemes are detailed below:

Downlink Data Transmission:
  Along with the downlink packet data transmission, L1/L2 control signaling is transmitted on a separate physical channel. This L1/L2 control signaling typically contains information on:
    The physical resource(s) on which the data is transmitted (e.g. subcarriers or subcarrier blocks in case of OFDM, codes in case of CDMA). This information allows the UE (receiver) to identify the resources on which the data is transmitted.
    The transport Format, which is used for the transmission. This can be the transport block size of the data (payload size, information bits size), the MCS (Modulation and Coding Scheme) level, the Spectral Efficiency, the code rate, etc. This information (usually together with the resource allocation) allows the UE (receiver) to identify the information bit size, the modulation scheme and the code rate in order to start the demodulation, the de-rate-matching and the decoding process. In some cases the modulation scheme maybe signaled explicitly.
    Hybrid ARQ (HARQ) information:
      Process number: Allows the UE to identify the hybrid ARQ process on which the data is mapped
      Sequence number or new data indicator (NDI): Allows the UE to identify if the transmission is a new packet or a retransmitted packet
      Redundancy and/or constellation version: Tells the UE, which hybrid ARQ redundancy version is used (required for de-rate-matching) and/or which modulation constellation version is used (required for demodulation)
    UE Identity (UE ID): Tells for which UE the L1/L2 control signaling is intended for. In typical implementations this information is used to mask the CRC of the L1/L2 control signaling in order to prevent other UEs to read this information.

Uplink Data Transmission:
  To enable an uplink packet data transmission, L1/L2 control signaling is transmitted on the downlink to tell the UE about the transmission details. This L1/L2 control signaling typically contains information on:
    The physical resource(s) on which the UE should transmit the data (e.g. subcarriers or subcarrier blocks in case of OFDM, codes in case of CDMA).
    The transport Format, the UE should use the transmission. This can be the transport block size of the data (payload size, information bits size), the MCS (Modulation and Coding Scheme) level, the Spectral Efficiency, the code rate, etc. This information (usually together with the resource allocation) allows the UE (transmitter) to pick the information bit size, the modulation scheme and the code rate in order to start the modulation, the rate-matching and the encoding process. In some cases the modulation scheme maybe signaled explicitly.
    Hybrid ARQ information:
      Process number: Tells the UE from which hybrid ARQ process it should pick the data
      Sequence number or new data indicator: Tells the UE to transmit a new packet or to retransmit a packet
      Redundancy and/or constellation version: Tells the UE, which hybrid ARQ redundancy version to use (required for rate-matching) and/or which modulation constellation version to use (required for modulation)
    UE Identity (UE ID): Tells which UE should transmit data. In typical implementations this information is used to mask the CRC of the L1/L2 control signaling in order to prevent other UEs to read this information.

There are several different flavors how to exactly transmit the information pieces mentioned above. Moreover, the L1/L2 control information may also contain additional information or may omit some of the information. E.g.:

HARQ process number may not be needed in case of a synchronous HARQ protocol

A redundancy and/or constellation version may not be needed if Chase Combining is used (always the same redundancy and/or constellation version) or if the sequence of redundancy and/or constellation versions is pre defined.

Power control information may be additionally included in the control signaling

MIMO related control information, such as e.g. precoding, may be additionally included in the control signaling.

In case of multi-codeword MIMO transmission transport format and/or HARQ information for multiple code words may be included In case of uplink data transmission, part or all of the information listed above may be signaled on uplink, instead of on the downlink. E.g., the base station may only define the physical resource(s) on which a given UE shall transmit, then he transport format, modulation scheme and/or HARQ parameters may be selected be the UE and, therefore, signaled on the uplink. Which proportion of this information is signaled on the uplink and which proportion is signaled on the downlink is typically a design issue and depends on the view how much control should be carried out by the network and how much autonomy should be left to the UE.

Generally, the information sent on the L1/L2 control signaling may be separated into the following two categories:

Shared Control Information (SCI) carrying Cat 1 information. The SCI part of the L1/L2 control signaling contains information related to the resource allocation (indication). The SCI typically contains the following information:
  User identity, indicating the user which is allocated.
  RB allocation information, indicating the resources (Resource Blocks, RBs) on which a user is allocated. Note, that the number of RBs on which a user is allocated can be dynamic.
  Optional: Duration of assignment, if an assignment over multiple sub frames (or TTIs) is possible.
  Depending on the setup of other channels and the setup of the Dedicated Control Information (DCI), the SCI may additionally contain information such as ACK/NACK for uplink transmission, uplink scheduling information, information on the DCI (resource, MCS, etc.).

Dedicated Control Information (DCI) carrying Cat 2/3 information. The DCI part of the L1/L2 control signaling contains information related to the transmission format (Cat 2) of the data transmitted to a scheduled user indicated by Cat 1. Moreover, in case of application of (hybrid) ARQ it carries HARQ (Cat 3) information. The DCI needs only to be decoded by the user scheduled according to Cat 1. The DCI typically contains information on:
  Cat 2: Modulation scheme, transport block (payload) size (or coding rate), MIMO related information, etc. (It should be noted that either the transport-block (or payload size) or the code rate can be signalled. In any case, these parameters can be calculated from each other by using the modulation scheme information and the resource information (number of allocated RBs.)
  Cat 3: HARQ related information, e.g. hybrid ARQ process number, redundancy version, re-transmission sequence number.

Persistent Scheduling

In the downlink, E-UTRAN can dynamically allocate resources to UEs at each TTI via the C-RNTI (Cell-Radio Network Temporary Identifier) on the L1/L2 control channel(s). A UE always monitors the L1/L2 control channel(s) in order to find possible allocation when its downlink reception is enabled (activity governed by DRX (discontinuous reception)).

In addition, E-UTRAN can allocate persistent downlink resources for first (initial) transmissions to UEs. When required, re-transmissions are explicitly (dynamically) signalled via the L1/L2 control channel(s) to the UE, since an asynchronous HARQ protocol is used in the downlink. Due to the asynchronous property of the downlink, the UE needs to be signalled explicitly for which data packet the re-transmission is intended In more detail, e.g. an N-process stop-and-wait HARQ protocol may be employed that has asynchronous re-transmissions in the DL and synchronous re-transmissions in the UL. Synchronous HARQ means that the re-transmissions of HARQ blocks occur at pre-defined periodic intervals. Hence, no explicit signaling is required to indicate to the receiver the re-transmission schedule. Conversely, asynchronous HARQ offers the flexibility of scheduling re-transmissions based on air interface conditions. In this case, some identification of the HARQ process needs to be signaled in order to allow for a correct combining and protocol operation.

Furthermore, a UE can be allocated to persistent resources. In the sub-frames where the UE has persistent resource, if the UE cannot find its C-RNTI on the L1/L2 control channel(s), a downlink transmission according to the persistent allocation that the UE has been assigned in the III is assumed.

There are several possibilities to discriminate between L1/L2 control signaling for activation/deactivation of a persistent grant and an allocation for a dynamic grant. Using an additional field for discrimination in the control information, an extra C-RNTI for persistent allocation or a codepoint in an existing field of the control information are among these possibilities.

Moreover, in the sub-frames where the UE has persistent resource, if the UE finds its C-RNTI on the L1/L2 control channel(s), the L1/L2 control channel allocation overrides the persistent allocation for that TTI, and the UE does not decode the persistent resources.

The objective of persistent scheduling is to reduce Layer 1 and Layer 2 control channel overhead, especially for VoIP traffic.

Figure 3:
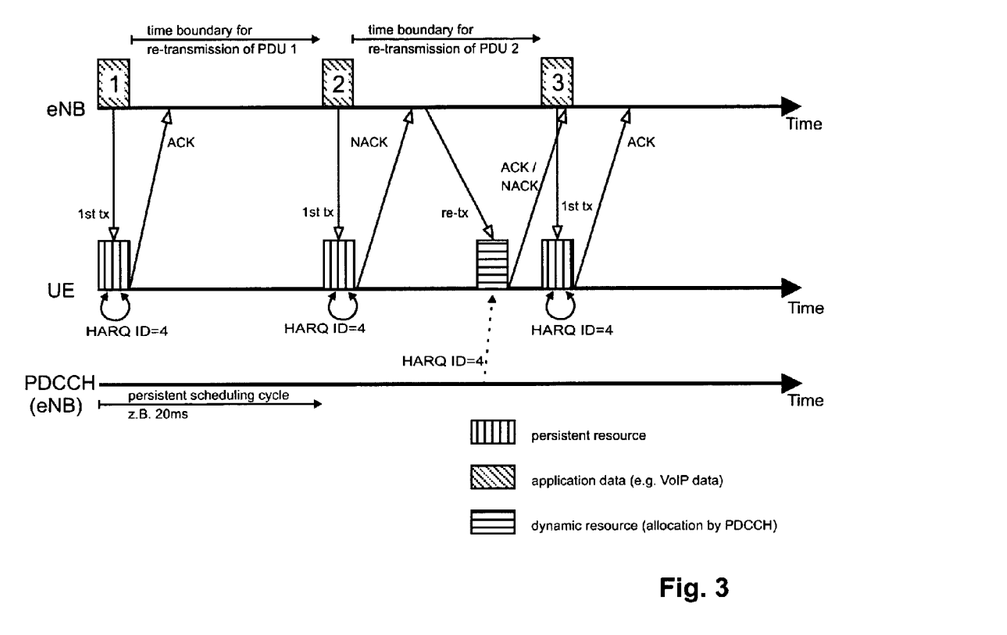
FIG. 3 is a diagram illustrating the packet exchange of persistently scheduled data when using the HARQ re-transmission protocol according to the prior art.

In FIG. 3 there is illustrated how persistently scheduled data packets (protocol data units) are transmitted between an evolved NodeB (eNB) and a mobile node (UE), wherein a PDCCH channel (Physical Downlink Control CHannel) is used to provide control information (L1/L2 control signaling) from the eNB to the UE so that the UE knows when, where and how to receive dynamically scheduled data. As already mentioned, when using persistent scheduling, the resources for transmitting first transmissions ($1^{st}$ tx) of data are allocated persistently (e.g. fixed time slots, e.g. every 20 ms), whereas re-transmissions of data (re-tx) are scheduled dynamically, i.e. depending on the current conditions of the communication channel. FIG. 3 is divided into the upper part, relating to the eNB which transmits data to the UE and into the middle part, relating to the UE which received the data. The lower part of the figure illustrates the control channel via which control information is transmitted from the eNB to the UE.

Figure 4:
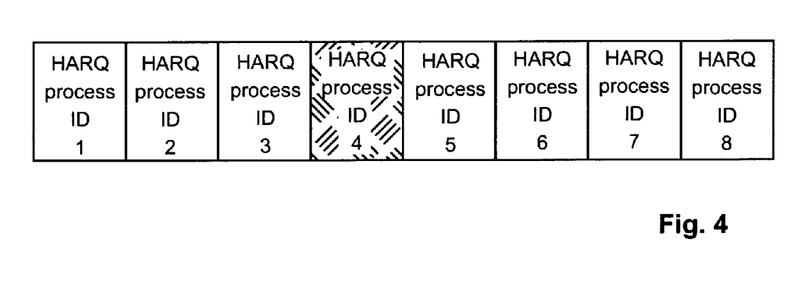
FIG. 4 shows eight HARQ processes, wherein one is reserved for persistently scheduled data.

It is assumed that the eNB transmits three protocol data units to the UE in the downlink, by using one HARQ process (e.g. ID=4) reserved to persistent scheduling, as illustrated in FIG. 4, and with time intervals of e.g. 20 ms. As apparent from FIG. 3, the first protocol data unit is received correctly by the HARQ process in the UE, the HARQ process in turn sending an ACK-message back to the eNB. The subsequent protocol data unit (second PDU) is transmitted 20 ms later than the first, and is not received correctly in the HARQ process. Consequently, the HARQ process in the UE transmits a NACK-message to the eNB for instructing it to perform a re-transmission for the second PDU since it wasn't correctly received. As mentioned previously, the re-transmission might be composed of identical, partly-identical or non-identical information (code bits/symbols) compared to the initially transmitted data packet (PDU) (see Type II of HARQ).

Furthermore, the re-transmissions in the downlink are scheduled dynamically, i.e. control information is transmitted to the UE, so that the UE knows when, where and how to receive the re-transmission of the second protocol data unit. The control information transmitted to the UE over the PDCCH channel comprises amongst other things the HARQ process ID (ID=4) of the HARQ process which is reserved for persistent scheduling. In accordance therewith, the UE receives the re-transmission of the second protocol data unit (re-tx) and stores same in the HARQ process ID=4 in which the initial transmission ($1^{st}$ tx) of the second PDU is already stored. Then, soft-combining is performed with the two received transmissions relating to the second PDU ($1^{st}$ tx and re-tx). In case soft-combining is successful, the second PDU is correctly decoded, and an ACK-message is provided to the eNB.

In case soft-combining is not successful, the second PDU cannot be decoded, and the UE needs to request a further re-transmission from the eNB by sending a NACK-message. However, since the second re-transmission for the second PDU would be effected after the initial transmission of the third PDU, the second re-transmission for the second PDU is not possible. In more detail, when having only one HARQ process reserved for persistent scheduling, each time a new PDU is transmitted to the UE, the corresponding reserved HARQ process, i.e. the associated memory, has to be flushed (emptied) in order to store the initial (and possible re-transmissions) for the new PDU. Thus, there is a time constraint for the re-transmissions for a specific PDU. Said time constraint limits the time interval for possible re-transmissions to the persistent scheduling cycle (in this example, 20 ms). Accordingly, the initial transmission and all re-transmissions for one specific PDU have to be successfully accomplished within the persistent scheduling cycle; otherwise, the specific PDU cannot be decoded correctly, in case the initial transmission and the re-transmission that are received in time cannot be soft-combined successfully to form the specific PDU.

Apparently, depending on the actual persistent scheduling cycle, this time constraint for re-transmissions can be quite stringent, which is disadvantageous for the system performance.

It would be possible to assign more than one HARQ process to the transmission of persistent scheduled data, in order to loosen said time constraint for re-transmissions. However, this in itself also implicates some disadvantages. For instance, currently 8 HARQ process are being intended by the standardization bodies; thus, 25% of all available HARQ processes would be reserved for persistent scheduling, and would thus not be available for the usual dynamic scheduling. Furthermore, the maximum achievable data rate of the UE is lowered as well.

Assuming that a normal dynamic scheduling scheme is utilized instead of the persistent scheduling, similar problems arise.

Furthermore, the overall number of HARQ processes is usually limited to 8, which might be disadvantageous in case several applications are running at the same time using the HARQ protocol.

SUMMARY OF THE INVENTION

Therefore, in view of the above problems in the state of the art, one object of the invention is to improve the HARQ protocol, and more specifically, the use of the various HARQ processes of the HARQ protocol.

A more specific object of the invention is to loosen the time constraints for HARQ re-transmissions. Another object of the invention is to increase the number of useable processes without increasing the size of the associated memory.

At least one of the above objects is solved by the subject matter of the independent claims. Advantageous embodiments of the invention are subject-matters of the dependent claims.

According to one aspect, the memory associated to one HARQ process is divided into a plurality of sub-areas, which can be addressed by an appropriate identifier. Then, when data is received, same is stored in one of the sub-areas. By providing more than one sub-area for one HARQ process, it is possible to actually use one HARQ process for two (or more) different received data units, being from the same data flow or from a different data flow. This can provide various advantages, such as more flexibility for the HARQ process management. Another advantage is merely that more HARQ processes are available. Other advantages stemming therefrom will become apparent from the following and from the detailed description of the invention.

According to another aspect, the actual sub-area of the one HARQ process for storing received data units is either freely selected at the receiving end or is indicated by an identifier associated with the data. In more detail, assuming that each data unit is transmitted along with control information, which is for example the case for dynamically scheduled data, then, memory sub-area identifier can be transmitted together with the data. Accordingly, the data units are stored in the memory sub-area indicated by the identifier. Correspondingly, with persistent scheduled data, where no control information is transmitted together with the initial transmissions of data units, the receiving end can e.g. consecutively select one of the various sub-areas when receiving a new data unit. Other selection schemes for the memory sub-areas are possible as well.

According to still another aspect, persistent scheduled data is transmitted in units that are scheduled at fixed time intervals on fixed resources. Thus, the control signaling field usually used for indicating a new data unit is not needed for persistent scheduled data, this being inherent from the reception timing. Thus, for re-transmissions (when required) for a persistently scheduled data unit, the control information comprises in said control signaling field the above-mentioned memory sub-area identifier indicating the actual sub-area for storing the re-transmission of the data unit. The sub-area is the same in which the initial transmission of said data unit has been stored by the HARQ process, the sub-area having been selected e.g. in a consecutive manner as mentioned above.

According to a further aspect, an extra HARQ process, not being one of the usual dynamic-assignable HARQ processes, is used to store data units, that are e.g. persistently scheduled. Again, the extra memory assigned to the extra HARQ process is divided into several sub-areas, which can be separately used to store and combine various transmissions for different data units. In said case however, the usual HARQ process identifier cannot be used. Instead another control signaling field has to be used for storing the identifier for indicating the extra HARQ process; in case of persistent scheduling, only in control signaling information for re-transmissions of a data unit.

One embodiment of the invention provides a method for receiving protocol data units in a mobile communication system. The protocol data units are received and transmitted using one of a plurality of HARQ processes of an HARQ re-transmission protocol. Each HARQ process has an associated memory area for storing transmissions of a protocol data unit. An initial transmission of a protocol data unit is received and stored in one of a plurality of memory sub-areas into which the memory area associated to the one HARQ process is divided. The one memory sub-area is selected based on control information, associated to the initial transmission of the protocol data unit, or the memory sub-area for storing an initial transmission is selected among the plurality of memory sub-areas in a pre-determined way.

According to another embodiment of the invention, control information, associated to a re-transmission for the protocol data unit, is received. The control information comprises a memory sub-area identifier, indicating the one memory sub-area in which the initial transmission of the protocol data unit is stored. The re-transmission for the protocol data unit is stored in the one memory sub-area indicated by the memory sub-area identifier of the received control information.

Another embodiment of the invention provides a method for receiving protocol data units in a mobile communication system. The protocol data units are transmitted using one of a plurality of HARQ processes of an HARQ re-transmission protocol, and each HARQ process has an associated memory area for storing transmissions of a protocol data unit. First, an initial transmission of a protocol data unit is received and stored in one of a plurality of memory sub-areas into which the memory area associated to the one HARQ process is divided. Then, control information, associated to a re-transmission for the protocol data unit, is received. The control information further comprises a memory sub-area identifier, indicating the one memory sub-area into which the initial transmission of the protocol data unit is stored. The re-transmission for the protocol data unit is stored in the memory sub-area indicated by the memory sub-area identifier of the received control information.

In a different embodiment of the invention the control information, associated to the re-transmission for the protocol data unit, also comprises an HARQ process identifier, identifying the one HARQ process used for transmitting and receiving the protocol data units. The UE is thus able to determine to which HARQ process the received re-transmission is destined.

Referring to an advantageous embodiment of the invention, a specific number of HARQ processes is available for transmitting and receiving data. However, an additional memory area is reserved for receiving the protocol data units that are persistently scheduled. Therefore, non of the usual number of HARQ processes is reserved and can be used for the remaining applications.

According to a different embodiment of the invention, one of the number of HARQ processes is selectable via a first HARQ process identifier, and the additional HARQ process is selectable via a second HARQ process identifier.

According to another embodiment of the invention, the second HARQ process identifier is inserted into the transport block size field of control information associated to persistently scheduled protocol data units. The reuse of already available, and advantageously unused, data fields, avoids the necessity to define new data fields and data overhead stemming from the new data fields.

In a further embodiment of the invention persistent scheduling is used for transmitting and receiving the protocol data units. The transmitting entity selects the one HARQ process for transmitting and receiving the persistently scheduled protocol data units among the plurality of HARQ processes of the HARQ protocol. In said case, the receiving entity is informed about the selected one HARQ process, during a configuration of the one HARQ process for use with persistent scheduling or by using control information for activating the HARQ process for use with persistent scheduling.

According to an advantageous embodiment of the invention, control information associated to the initial transmission of the protocol data unit is received. Said control information comprises a memory sub-area identifier, that is indicating the one memory sub-area into which the initial transmission of the protocol data unit is to be stored. Therefore, the embodiment of the invention can be also applied for dynamically scheduled data.

Concerning a different embodiment of the invention, transmissions for a second protocol data unit, following the protocol data unit, are stored in a different memory sub-area than the one memory sub-area into which the transmissions for the protocol data unit are stored. Thus, the first memory sub-area needs not to be flushed and can still store further re-transmissions for the first data packet if necessary.

A further advantageous embodiment of the invention suggest to insert a memory sub-area identifier into the New Data Indicator field of control information. When using persistent scheduling, the New Data Indicator in the New Data Indicator field is not necessary, and can be used to store the memory sub-area identifier. Thus, no data overhead is generated.

One embodiment of the invention further provides an apparatus for receiving protocol data units in a mobile communication system. The protocol data units are received using one of a plurality of HARQ processes of an HARQ re-transmission protocol, and each HARQ process has an associated memory area for storing transmissions of a protocol data unit. A memory area of the apparatus stores transmissions of a protocol data unit, associated with the one HARQ process, wherein the memory area of the one HARQ process is divided into a plurality of memory sub-areas. A receiver of the apparatus receives an initial transmission of a protocol data unit. A processor of the apparatus stores the received protocol data unit in one of the plurality of memory sub-areas of the one HARQ process. The one memory sub-area is selected based on control information associated to the initial transmission of the protocol data unit, or the memory sub-area for storing an initial transmission is selected among the plurality of memory sub-areas in a pre-determined way.

A further embodiment of the invention provides an apparatus for receiving protocol data units in a mobile communication system. The protocol data units are received using one of a plurality of HARQ processes of an HARQ re-transmission protocol, and each HARQ process has an associated memory area for storing transmission of a protocol data unit. A memory area of the apparatus stores transmissions of a protocol data unit, associated with the one HARQ process, wherein the memory area of the one HARQ process is divided into a plurality of memory sub-areas. A receiver of the apparatus receives an initial transmission of a protocol data unit. A processor of the apparatus stores the received protocol data unit in one of the plurality of memory sub-areas of the one HARQ process.

The receiver further receives control information, associated to a re-transmission for the protocol data unit. The control information comprises a memory sub-area identifier, indicating the one memory sub-area in which the initial transmission of the protocol data unit is stored. The processor stores the re-transmission for the protocol data unit in the one memory sub-area indicated by the memory sub-area identifier of the received control information.

Finally, an embodiment of the invention provides an apparatus for transmitting protocol data units in a mobile communication system. The protocol data units are received using one of a plurality of HARQ processes of an HARQ re-transmission protocol, and each HARQ process has an associated memory area for storing transmissions of a protocol data unit. A memory area of the apparatus associated with the one HARQ process stores transmissions of a protocol data unit. A transmitter of the apparatus transmits an initial transmission of the protocol data unit, wherein the receiving entity uses an HARQ process to receive and store the transmissions for the protocol data unit. The memory area associated with the receiver's HARQ process is divided into a plurality of memory sub-areas. A processor of the apparatus stores the transmitted protocol data unit into the memory area of the one HARQ process. The transmitter transmits control information to the receiving entity for re-transmissions for the protocol data unit. The control information comprises a memory sub-area identifier, indicating the one memory sub-area of the receiver's HARQ process into which the initial transmission of the protocol data unit is stored.

BRIEF DESCRIPTION OF THE FIGURES

In the following the invention is described in more detail with reference to the attached figures and drawings. Similar or corresponding details in the figures are marked with the same reference numerals.

DETAILED DESCRIPTION

Definitions

In the following a definition of a few terms frequently used in this document will be provided.

A mobile node is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over it may communicate with other functional entities or correspondent nodes.

The explanations given in the Technical Background section above are intended to better understand the specific exemplary embodiments described herein and should not be understood as limiting the invention to the described specific implementations of processes and functions in the mobile communication network. Nevertheless, the improvements proposed herein may be readily applied in the architectures/systems described in the Technological Background section and may in some embodiments of the invention also make use of standard and improved procedures of theses architectures/systems. Similarly, the following paragraphs will describe various embodiments of the invention. It should be noted that the invention may be advantageously used for example in connection with various mobile communication system such as the 3GPP communication system, but the invention is not limited to its use in this particular exemplary communication network.

Figure 5:
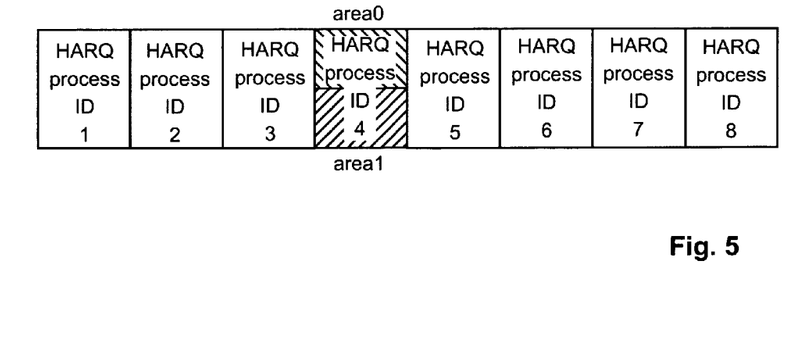
FIG. 5 shows eight HARQ processes, wherein one is reserved for persistently scheduled data and is sub-divided into two separate portions according to one embodiment of the invention.

As indicated above, one main aspect of the invention is to split the memory of one HARQ process up into several sub-areas. FIG. 5 shows the usual eight HARQ processes of the HARQ protocol, wherein the fourth is further sub-divided into two distinct areas, denoted area 0 and area 1, for illustrating the division of the HARQ process 4's memory. By splitting the memory, it is possible to use the same HARQ process for two different data units, however distributing the transmissions for the two different data units between the two memory areas. This procedure will be illustrated in more detail below. However, it should be noted that the following is merely an example of how the principles of the invention can be actually implemented. Variations from the following are apparent to a person skilled in the art without specific mentioning them.

Figure 6:
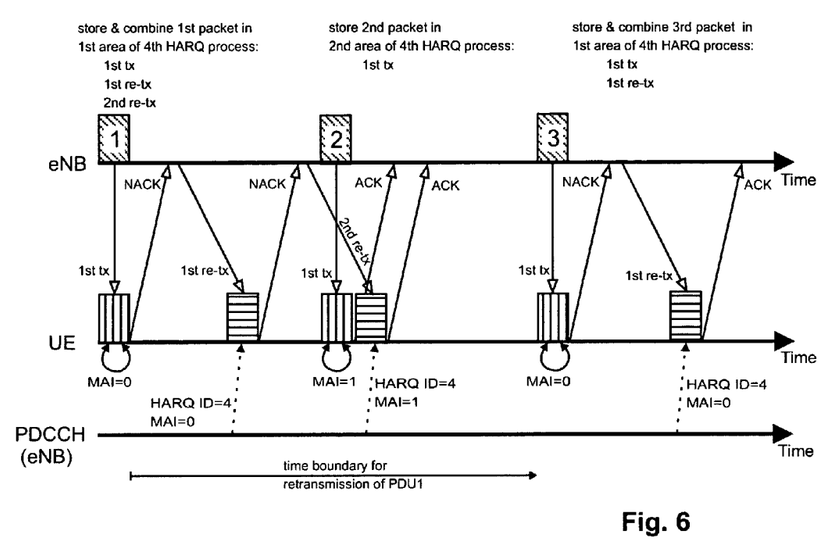
FIG. 6 is a diagram illustrating the packet exchange of persistently scheduled data when using an HARQ process of the HARQ protocol being sub-divided into separate areas, according to one embodiment of the invention.

With reference to FIG. 6 an embodiment of the invention will be illustrated, i.e. how three protocol data units can be transmitted from a eNB to a UE by using an HARQ process (in this case e.g. 4), whose memory is sub-divided into two separate memory sub-areas. It is further assumed for said exemplary embodiment of the invention that persistent scheduling is used for all initial transmissions of data units ($1^{st}$ tx), and that dynamic scheduling is applied for all re-transmission performed for a particular data unit ($1^{st}$ re-tx, $2^{nd}$ re-tx).

The communication system, i.e. the UE and the eNB, are configured by RRC (Radio Resource Control) to use persistent scheduling. Furthermore, control signaling over the PDCCH is used for activation and deactivation of the persistent scheduling in the UE. In more detail, a code point (bit string) in the transport block size field (5 bits long) is used for activating and deactivating the persistent scheduling. Accordingly, the actual HARQ process reserved for persistently scheduled data can be selected e.g. during the configuration procedure with RRC.

The division of the HARQ processes' memory, according to the embodiment of the invention, might also be configured during the RRC configuration procedure for the persistent scheduling. In said respect, the specific division of the memory of an HARQ process can be handled flexibly by each entity. In particular, the memory associated to one HARQ process can be split up into one or more sub-areas, with either equal sizes or with different sizes each. The actual configuration can be decided depending on the kind of application data transmitted via the HARQ process, or depending on other relevant constraints. For instance, persistent scheduling is mostly used for Voice over IP transmissions, in which the data units are all the same size. Thus, it would make no sense to provide several sub-areas with different sizes; instead, the memory area of the selected HARQ process is divided into equal portions.

On the contrary, in case application data with different data unit sizes is transmitted, it actually might be advantageous to have memory sub-areas with different sizes, so as to effectively assign the differing data units to the appropriate sub-areas thereby increasing the HARQ process operation's efficiency.

After the HARQ process has been appropriately configured and activated, HARQ process nr. 4 is reserved just for said persistent scheduled transmissions. The UE listens for data units being received as indicated by the persistent scheduling, and when it receives a data unit, it knows that it is persistently scheduled data which is to be received by using HARQ process 4; no specific control signaling is available or needed in said respect. The memory sub-area of HARQ process 4 is selected in a pre-determined way. For instance, when having only two different sub-areas, sub-area 0 is selected first, and then, for the next new data units the other area is used, such that new data units are alternately stored in the two memory sub-areas. Further, in case more sub-areas are available, the sub-areas could be selected consecutively for storing new data packets. Other selecting sequences are possible as well, and are up to the operator configuration of the HARQ protocol.

As already discussed, the UE receives an initial transmission for a first data unit. According to an exemplary selection, memory sub-area 0 is used by the HARQ process 4 for storing transmissions of the first data unit. The data unit stored in the HARQ process 4 however cannot be correctly decoded, and thus a negative Acknowledgment message is transmitted to the eNB.

Since a synchronous protocol is used in the uplink between the UE and the eNB, the eNB knows from the predefined timing of the NACK, to which data packet a re-transmission belongs.

Furthermore, being independent from the actual selection done by the UE, since no information is transmitted from the UE to the eNB regarding which data packets are stored in which sub-area, and since the eNB however needs to know about the selected sub-area, it is necessary for the eNB to keep track of the selecting sequence, so that re-transmissions can be appropriately addressed to the correct sub-area, as will become apparent below. To said end, the eNB needs to know the configuration of the UE's HARQ process and the number of sub-areas in the reserved HARQ process.

In more detail, eNB needs to know that HARQ process 4 is used for the persistently scheduled data, further that the first data packet is stored in area 0 of HARQ process 4, and that subsequent data units will be stored alternately in area 1 and area 0. In accordance therewith, when using more than two sub-areas with one HARQ process, the eNB also needs to know at all times, which data packet was stored in which sub-area of the HARQ process 4.

As a result thereof, the eNB can carry out a re-transmission for the first data unit, and dynamically schedule same over the PDCCH. Apart from other parameters, the eNB needs to insert into the control signaling the HARQ identifier (ID=4) and an identifier for identifying the specific sub-area into which the initial transmission has been stored by the HARQ process in the UE.

Figure 7:
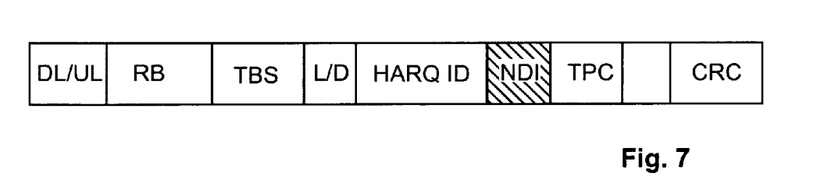
FIG. 7 depicts a control signaling format used in the downlink, in which the NDI is marked as being used for identifying the memory sub-area of one HARQ process, according to one exemplary embodiment of the invention.

FIG. 7 shows an exemplary part of the control signaling in the DL, with the following fields: DUUL=DUUL selector; RB=Resource Blocks; TBS=Transport Block Size; UD=Localized/distributed indicator HARQ ID; NDI=New Data Indicator, TPC=Transmission Power Control; CRC=Cyclic Redundancy Code. Control signaling, transmitted from the eNB to UE, for the Uplink is similar to the DL control signaling, however differs in some aspects. For instance, the UD field does not exist for the Uplink. Conversely, the Uplink control signaling comprises a CQI flag field to indicate CQI information transmitted in the UL, whereas said CQI field is not available in the DL control signaling.

The HARQ process ID can be inserted by the eNB in the corresponding usual HARQ ID field available in the control signaling format. However, no such field is already defined for the memory sub-area identifier (denoted MAI in the following). Therefore, a new field could be added to the control signaling format in order to store said MAI. However, this would imply additional data that needs to be transmitted over the air interface, which is generally to be avoided.

Advantageously, the MAI should be inserted into a field which is currently not in use within the control signaling. For persistent scheduling the new data indicator field is no longer necessary since there is no need to signal the arrival of new data, this being implicit in the transmission/receiving timing of new data. In more detail, new data is transmitted in pre-determined intervals, thus making a specific indicator superfluous. Correspondingly, the NDI field of the control signaling format can be used to store the MAI.

As explained above, the first re-transmission ($1^{st}$ tx) for the first data unit is dynamically scheduled, and thus the accompanying control signaling comprises the HARQ process ID=4 and the MAI=0, as can be seen at the bottom of FIG. 6. Based on the accompanying information, the UE can direct the first re-transmission of the first data packet to the $4^{th}$ HARQ process, and further into the first sub-area of the HARQ process 4, area 0. In area 0, the initial transmission of the first data packet is stored, and the HARQ process tries to soft-combine the initial transmission with the received re-transmission. In FIG. 6 it is assumed that the soft-combining is not successful, and a NACK-message is sent back to the eNB for requesting a further re-transmission.

Again, the eNB knows from the reception timing to which data unit the NACK-message belongs, and is thus able to provide another re-transmission for the first data packet to the UE.

At generally the same time, the persistent scheduling cycle lapses, and a new data packet is to be transmitted to the UE, see data packet 2 in FIG. 6. Thus, when the UE receives the second data packet, it knows from the persistent scheduling that HARQ process 4 is to be used, and further deduces that the second sub-area should store the initial transmission of the second data packet; the first sub-area was selected for the previous data unit. As already mentioned, the UE merely selects the remaining sub-area of the HARQ process 4. In case more sub-areas are available, an appropriate sub-area is selected by the UE according to a pre-determined selection scheme.

Correspondingly, the first transmission of the second data packet is stored in area 1 of HARQ process 4, and provided that it could be decoded correctly, an ACK-message is sent back to the eNB. Since the second sub-area can be used for the new, second, data packet, the first sub-area comprising the initial transmission and the first re-transmission for the first data packet does not need to be flushed. Thus, the second re-transmission for the first data packet, can be stored in the first area of HARQ process 4, as indicated in the control signaling being sent together with said second re-transmission. It is thus possible that the first data packet is finally decoded correctly, by soft-combining the three transmission, carried out for the first data packet, i.e. by combining the initial transmission and both re-transmissions for the first data packet.

Thus, the time boundary for possible re-transmissions of PDU 1, as plotted in FIG. 6, has effectively doubled in comparison with the time boundary according to FIG. 3. In the prior art system (see FIG. 3), the first data packet would not have been decoded correctly, since due to the transmission of PDU 2, the memory area containing the transmissions for PDU 1 would have been flushed too early for the second re-transmission for PDU 1 to be received. The time constraint is further loosened when using more than two sub-areas for one HARQ process, or when using more HARQ process that are divided into several sub-areas. Accordingly, depending on the number sub-areas per HARQ process assigned to said data flow transmission, the time boundary can be n times the boundary of FIG. 3.

In accordance with the above described procedure, after the persistent scheduling cycle expires, another data packet is transmitted from the eNB to the UE. This time, the first sub-area of HARQ process 4 is used to store the initial transmission of PDU 3. However, the first sub-area needs to be flushed first, which however is non-critical since the transmissions for PDU 1 have already been soft-combined successfully to form PDU 1. Now, provided that the initial transmission of PDU 1 could not be decoded correctly, a re-transmission for same is effected, which the UE stores correctly in the first sub-area of HARQ process 4, based on the specific control signaling for the re-transmission (HARQ process ID=4; MAI=0). Naturally, more data packets can be transmitted in said fashion, though the exemplary embodiment only deals with transmitting three data units.

Figure 8:
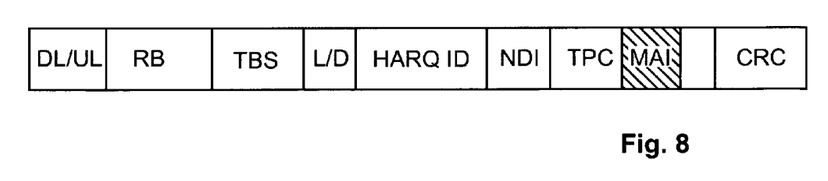
FIG. 8 depicts a control signaling format used in the downlink, in which a new field is defined for storing the Memory sub-Area Identifier, according to another exemplary embodiment of the invention.

Referring now to FIG. 8, the memory sub-area identifier (MAI) for identifying the different sub-areas of one HARQ process can be inserted into a separate control signaling field, as already hinted at before. FIG. 8 shows an exemplary position of said field in the control signaling format. A skilled person of course is able to adapt the position of the field to his needs. The skilled person might also devise other ways of providing the MAI to the UE, so as to correctly indicate the sub-area for re-transmissions and also for initial transmissions (see later with reference to FIG. 10) for a specific data unit.

As was already mentioned, the amount of memory associated to a specific HARQ process can be divided not only in two but also in more sub-areas. In said case however, it is not possible to store the MAI into the NDI field of the control signaling, since 1 bit does not suffice to address more than two sub-areas. In other words, the MAI can be inserted into the unused NDI field only in case two memory sub-areas are present for one HARQ process. In order to correctly address 4 areas, 2 bits are necessary and another field has to be used or defined in said respect. The same applies to non-persistent, i.e. dynamically, scheduled data, for which the NDI field is still in use, as will be elaborated on later.

According to the current standardization status, eight HARQ processes are provided for the HARQ protocol, which share one large memory area, though the number of HARQ processes may change in the future without prejudice to the present invention. In other words, a pre-determined memory area/amount is reserved for the HARQ protocol, wherein the HARQ protocol is divided into eight processes, each being assigned one part of the available memory amount. The memory areas of the HARQ processes may be either equal or different from each other, depending on the actual application and operator's needs.

Figure 9:
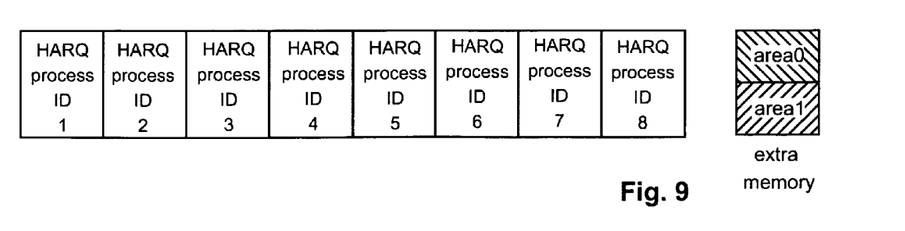
FIG. 9 shows eight HARQ processes, wherein an extra memory, not being part of the memory associated to the eight HARQ processes, is used for persistent scheduled data, and is sub-divided into two sub-areas according to another embodiment of the invention.

Instead of reserving one of the eight HARQ processes for persistently scheduled data (as in the embodiments before), an extra amount of memory can be reserved in said respect. That is, a specific memory area, being outside the memory area that is reserved for the HARQ protocol, is used to store transmissions for persistently scheduled data. This is illustrated in FIG. 9, which shows the eight HARQ processes, all sharing one big memory area, and separate from the HARQ process extra memory is provided for the persistent scheduled data.

Similar to the previous embodiments, the extra memory area is further sub-divided into two areas, area 0 and area 1, in which data units can be separately and alternately stored. Principally, the procedure is similar to the one discussed with reference to FIG. 6. For instance, the use of the MAI remains the same. However, one difference lies in the addressing of the separate extra memory area. Previously, the HARQ process ID, transmitted in the control signaling for the re-transmissions would indicate to the UE which HARQ process the re-transmission was destined to. However, since the 2-bit HARQ process ID is fully used to address the eight available HARQ processes, the extra memory needs to be indicated in a different way.

The Transport Block Size can be further exploited when using persistent scheduling, since the data unit size is generally the same throughout the data flow. Therefore, a code point (bit string) can be defined in the transport block size field which could indicate that the extra memory is to be used by the UE to store a re-transmission or a transmission (see later) for a specific data packet. Advantageously, the same code point as for activating/deactivating the persistent scheduling can be used. However, then it would be necessary to further distinguish between the activation and the indication of the extra memory. This distinction can be achieved by setting other bit(s) of the control signaling in combination with the code point of the TBS field. For instance, the HARQ process ID field is unused when using the extra memory, and could thus be used in combination with the TBS field to provide a specific bit string (HARQ process ID+TBS) for uniquely indicating the use of extra memory. Alternatively, the NDI field can be used, wherein this would implicate that the addressing of the sub-areas is accomplished by inserting the MAI into another field of the control signaling than the NDI field. Also, when using dynamic scheduling of initial transmissions, the NDI field cannot be used. In such cases. a new field can be defined in the control signaling for addressing the extra memory.

Similar to the exemplary embodiment of FIG. 6, it is assumed for the following that the eNB transmits data packets to the UE using persistent scheduling. The first data unit is transmitted without control signaling, the UE however knows from the previous configuration of the HARQ protocol that extra memory is to be used for persistently scheduled data and also knows the specific sub-area of the extra memory to be used to store the initial transmission of said PDU 1. Thus, in contrast to FIG. 6, no "normal" HARQ process is used, rather the extra memory is utilized in said respect. Again a NACK-message is transmitted back to the eNB, since the PDU 1 could not be decoded correctly. Based on transmission timing (no control signaling is transmitted on the uplink), the eNB knows to which data unit the NACK belongs, and thus initiates the re-transmission for PDU 1. The control signaling for the re-transmission comprises either an extra identifier in a newly defined field or a pre-defined code point in the transport block size field, together with the HARQ process ID, for pointing out to the UE that the re-transmission is destined for the extra memory. The control signaling further contains the MAI, either in the NDI field (advantageous when having only two sub-areas, as with FIG. 9) or within a newly defined field (as in FIG. 8), indicating the first sub-area (MAI=0). Furthermore, in case an extra field/identifier is used for indicating the use of the extra memory, an arbitrary HARQ process ID is inserted into the HARQ process ID field, which is ignored by the UE as soon as the UE realizes that the re-transmission is actually meant for the extra memory. Thus, the UE is able to correctly store the re-transmission for PDU 1 into the first sub-area of the extra memory, in which the initial transmission of PDU 1 has been previously stored. The soft-combining of the two transmission fails, thus triggering a NACK-message transmission to the eNB.

Similarly, the eNB effects another re-transmission for PDU 1, again signaling the extra memory e.g. in the TBS field+HARQ field and the sub-area identifier MAI e.g. in the NDI field of the control signaling.

As with the previous embodiment of FIG. 6, a new data unit is stored by the UE in the extra memory and more specifically in the second sub-area. Thus, re-transmissions for PDU 2 would be signaled with MAI=1 (not shown in FIG. 6) by eNB. Again, the time constraint for re-transmission(s) for one data unit is loosened, in this case, the time which can be used for re-transmissions is doubled.

Figure 10:
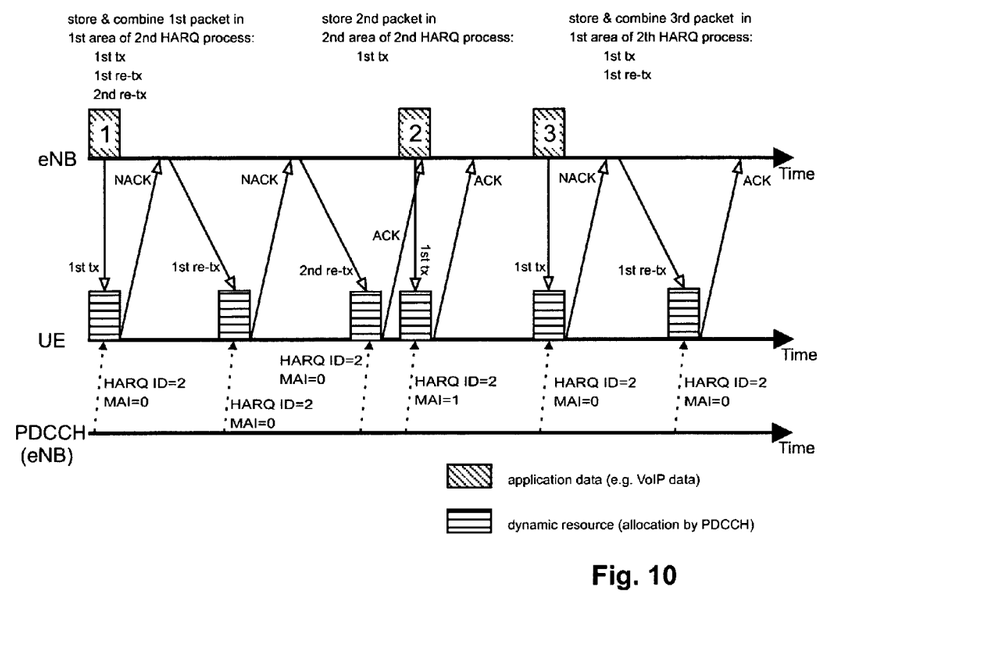
FIG. 10 is a diagram illustrating the packet exchange of dynamically scheduled data, when using an HARQ process of the HARQ protocol being sub-divided into two separate portions, according to another embodiment of the invention.

In the following another embodiment of the invention will be specified in which non-persistent (dynamic) scheduling is used instead of the persistent scheduling assumed for the previous embodiments. In said respect, FIG. 10 illustrates, similar to FIG. 6, how three data units are provided between the eNB and the UE. The difference between the scenario for persistent scheduling and dynamic scheduling is that also the initial transmissions of data units are dynamically scheduled, as well as the re-transmissions which are dynamically scheduled in both scenarios. Also, the MAI cannot be stored into the NDI field anymore, since said field is necessary to distinguish between a re-transmission for a previous data packet and an initial transmission of a new protocol data unit.

In more detail, since control signaling is transmitted together with the initial transmission of PDU 1, the control signaling comprises the HARQ process ID (assuming ID=2 in FIG. 10, for embodiments not using the extra memory as explained for FIG. 9) and the memory sub-area identifier (MAI=0), amongst other important parameters. Using said indication, the UE stores the received initial transmission of PDU 1 in the first sub-area of HARQ process 2. All re-transmissions ($1^{st}$ re-tx, $2^{nd}$ re-tx) are addressed in the same way, so that all transmissions belonging to one particular data unit are stored in the same HARQ process and in the same sub-area. Accordingly, the ensuing data unit PDU 2 (and its re-transmissions (not shown in FIG. 10)) are then stored in area 1, and the further ensuing data unit PDU 3 (and its re-transmissions) are again stored in area 1, after area 1 has been flushed.

In summary, the embodiment using dynamic scheduling for all transmissions differs from the embodiment with persistent scheduling in that the control signaling for the initial transmission has to comprise the MAI, as well as the HARQ process ID or code point in the TBS+HARQ field (when using extra memory, as in FIG. 9).

Figure 11:
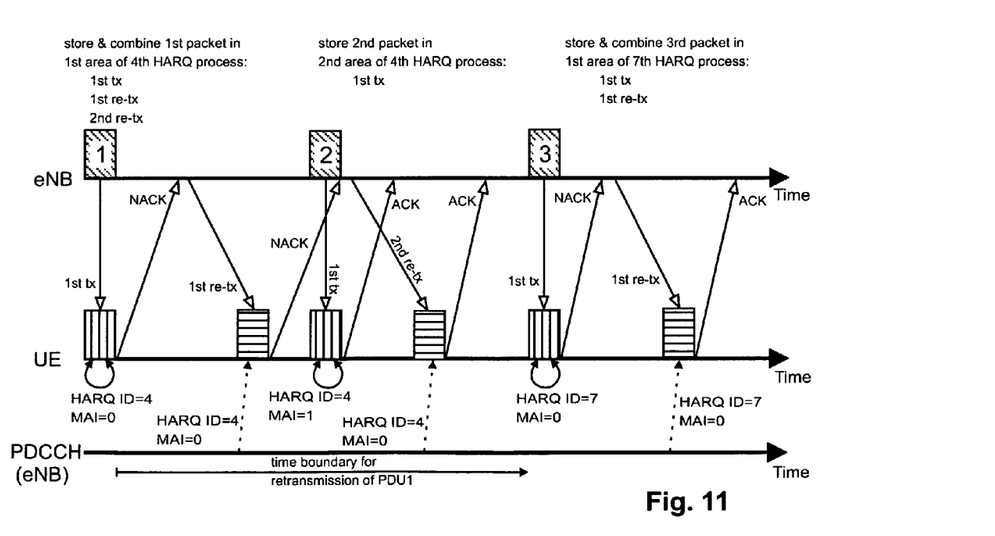
FIG. 11 is a diagram illustrating the packet exchange of persistently scheduled data, when using two HARQ processes of the HARQ protocol, each being sub-divided into two separate portions, according to another embodiment of the invention.

Moreover, more than one HARQ process can be used for persistent scheduling, in which case the time constraint for re-transmissions is loosened further more, as will be explained below. It is assumed that the two HARQ process memories are sub-divided into two sub-areas. Thus, effectively four memory sub-areas are available for storing transmissions of four data units at the same time. In said respect, FIG. 11 shows a diagram in which two HARQ processes are used for receiving and transmitting the persistently scheduled data packets, the HARQ process memories respectively being divided into sub-areas 0 and 1. Now, e.g., the two HARQ processes can be used alternately, and the sub-areas as well. Thus, the first data packet is stored by HARQ process 4 into the first sub-area, and the second data packet into the second sub-area of HARQ process 4. Then, the third data packet is stored by HARQ process 7 into the first sub-area, and the fourth data packet into the second sub-area of HARQ process 7. The next data packet would then be stored again into the first sub-area of HARQ process 4, after the transmissions for the first data packet are deleted; and so on.

Thus, the HARQ processes can be used consecutively, wherein all transmissions for one data packet are stored in the same HARQ process memory sub-area. Again, the time constraint for re-transmissions is loosened in comparison to FIG. 3, the time limit being four times the one of FIG. 3.

In the following, details for the de-allocation of persistently scheduled resources briefly hinted at before will be described in more detail. A code-point can be reserved to signal the de-allocation of the persistent resources. This code-point could be reserved in the TPC field, which is unused for persistent scheduling. Currently, in the standardization this field holds two bits; so four code-points can be allocated for persistent scheduling. Since this field is also foreseen to select the transport format size used for the allocated persistent resources, at least three code-points are foreseen to be used for this indication. The fourth code-point can be used to signal the de-allocation of the persistent resources. Another possibility would be to signal said code-point in the RB field. Hence, a special combination of bits (the code-point) in the RB field together with the code-point that indicates persistent scheduling in the TBS field indicates the de-allocation of the persistent resources.

One issue that has not been broached yet is the HARQ process configuration in the eNB, being the transmitting entity in comparison with the UE, being the receiving entity. It is usual that the HARQ protocol employs the same number of HARQ processes in the eNB as in the UE. The HARQ protocol uses several HARQ processes in the eNB to transmit data packets to the UE. In case of persistent scheduling, during the configuration one of the HARQ processes in the eNB is reserved for persistently scheduled data. The HARQ process might be the same as in the UE, however might also be different for some reasons. Correspondingly, the eNB when performing an initial transmission of a data unit, saves the data unit in the memory area assigned to the reserved HARQ process, until a corresponding acknowledgment for the transmitted data packet has been received from the UE. When said acknowledgement is received, the transmission buffer region is flushed, and the stored data packet is deleted.

However, in case the unicast data packet could not be decoded correctly in the UE, a non-acknowledgment is received in the eNB. The radio control entity must be able to unambiguously identify to which HARQ process the NACK or ACK refers to, which is done by transmitting the HARQ feedback messages (ACK/NACK) after a predetermined time upon reception of a data packet, according to the synchronous protocol used for the uplink. Based on the timing of the ACK/NACK signalling the radio control entity can thus identify the corresponding HARQ process and initiate a re-transmission of the data packet in case a NACK was received. The data unit stored in the identified HARQ process is used by the eNB for carrying out a re-transmission for said data packet to the mobile node, using again the same HARQ process.

In the easiest case, the HARQ process configuration is the same for receiver (UE) and transmitter (eNB). That is, the same HARQ processes are used for the same data units; HARQ process 4 is used in the transmitter and in the receiver to respectively transmit and receive data using the HARQ protocol. However, both entities need to know each for itself which HARQ process contains which data, so that an unequivocal addressing of incoming transmissions can be effected. With regard to the eNB, this means that it basically must know the following: which HARQ process contains the data for a received ACK/NACK message, and which HARQ process is used by the UE for said data (for addressing said HARQ process in the control signaling).

The same reasoning may be applied to the embodiments of the present invention. For instance, the HARQ process configuration in the eNB might advantageously mirror the HARQ process configuration in the UE. In more detail, both the HARQ process 4's memory in the eNB and in the UE are sub-divided into two memory sub-areas, thus making it easy for the eNB to know at all times to which HARQ process and to which sub-area to address transmissions (and/or re-transmissions) for one particular data packet.

Again, this is however not mandatory, since it would be possible for the eNB to have a completely different configuration than the UE. Accordingly, it might be that no HARQ process is sub-divided at all in the eNB. Instead, two HARQ processes can be used in the eNB, where the UE uses only one HARQ process, sub-divided into two, for the same data flow.

A skilled person can infer from the previous discussion that the corresponding HARQ configurations of the eNB and the UE may differ more or less, depending on the actual configuration.

Furthermore, though the above-discussed embodiments of the invention refer to a transmission on the downlink, the same would apply for transmissions originating at the UE and being destined for the eNB.

Actually, the above-described principles of the various embodiments of the invention can be used between all kind of entities that use the HARQ protocol.

As mentioned above, in case an extra memory area is used for receiving and storing persistently scheduled data units (see FIG. 9 and accompanying description), a code point is inserted into the transport block size field for re-transmission grants, in order to instruct the UE to use the extra memory area for storing the data unist. The TBS (also called MCS field, Modulation & Coding Scheme field) is used in combination with the RB field to indicate the transport block size, and is also used for signalling the modulation and coding scheme to be used.

When using the code point in the TBS field, the transport block size information cannot be indicated for re-transmissions on persistently scheduled data, since it is already used otherwise. However, usually for re-transmissions of persistently scheduled data (e.g. VoIP) the transport block size is inherently known from the initial transmissions, since the size remains basically the same. Alternatively, an extra field needs to be defined for indicating the transport block size of re-transmissions, when the transport block size still needs to be signaled. For instance, in case the extra memory would also be used for dynamically scheduled data, the transport block sizes of the initial and re-transmissions can be different, since re-transmissions can also be composed of partly-identical or non-identical information (code bits/symbols) compared to the initially transmitted data packet.

In any case, it might also be useful to indicate a change in the modulation and coding scheme used for the re-transmission. A solution to this problem is to use other control data fields that are not needed for persistent scheduling re-transmission grants for signaling information on the transport data. This can be e.g. the HARQ process ID field or the TPC field.

Another issue is the reception of a control message for de-allocation. If a UE misses the de-allocation message, it might continue to decode the data it expects on the predefined resources even though there is no data anymore for this UE on these resources. Hence, this would result in false NACKs by this UE.

As ACK/NACK messages are only used to indicate correct/erroneous reception of data and are not used for control signalling, there is currently no possibility for the eNB to have knowledge on UE's correct reception of the de-allocation message. It is therefore beneficial to sent an explicit ACK upon the correct reception of a 'de-allocation of persistent resources' control message, even though no data transmission is associated with this control message.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

It should be further noted that most of the embodiments have been outlined in relation to a 3GPP-based communication system and the terminology used in the previous sections mainly relates to the 3GPP terminology. However, the terminology and the description of the various embodiments with respect to 3GPP-based architectures is not intended to limit the principles and ideas of the inventions to such systems.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technological Background section. Furthermore the concept of the invention may be also readily used in the LTE RAN currently discussed by the 3GGP.

The invention claimed is:

1. A method for receiving protocol data units in a mobile communication system, wherein the protocol data units are received and transmitted using one of a plurality of HARQ processes of an HARQ re-transmission protocol, wherein each HARQ process has an associated memory area for storing transmissions of a protocol data unit, the method comprising:
  receiving an initial transmission of a protocol data unit,
  storing the received initial transmission of the protocol data unit in one of a plurality of memory sub-areas into which the memory area associated to the one HARQ process is divided,
  wherein the one HARQ process is divided into a plurality of HARQ sub-processes, wherein each of the HARQ sub-processes has one associated memory sub-area out of the plurality of memory sub-areas into which the memory area of the one HARQ, process is divided,
  wherein the one memory sub-area is selected based on control information, associated to the initial transmission of the protocol data, unit, or the one of the memory sub-areas for storing the initial transmission is selected among the plurality of memory sub-areas in a pre-determined way.

2. The method according to claim 1 further comprising the steps of:
  receiving a control information, associated to a re-transmission for the protocol data unit, and comprising a memory sub-area identifier, indicating the one of the memory sub-areas in which the initial transmission of the protocol data unit is stored, and
  storing the re-transmission for the protocol data unit in the one memory sub-area indicated by the memory sub-area identifier of the received control information.

3. The method according to claim 2, wherein the control information, associated to the re-transmission for the protocol data unit, comprises an HARQ process identifier, identifying the one HARQ process used for transmitting and receiving the protocol data units.

4. The method according to claim 3, wherein a specific number of HARQ processes is available for transmitting and receiving data, and wherein an additional memory area is reserved for receiving the protocol data units that are persistently scheduled.

5. The method according to claim 4, wherein one of the number of HARQ processes is selectable via a first HARQ process identifier, and the additional HARQ process is selectable via a second HARQ process identifier.

6. The method according to claim 5, wherein the second HARQ process identifier is inserted into the transport block size field of control information associated to persistently scheduled protocol data units.

7. The method according to claim 1, further comprising the step of:
  receiving the control information associated to the initial transmission of the protocol data unit, comprising a memory sub-area identifier, that is indicating the one of the memory sub-areas into which the initial transmission of the protocol data unit is to be stored.

8. The method according to claim 7, wherein control information associated to the re-transmission for the protocol data unit comprises the same memory sub-area identifier as the memory sub-area identifier of the control information associated to the initial transmission of the protocol data unit.

9. A method for receiving protocol data units in a mobile communication system, wherein the protocol data units are transmitted using one of a plurality of HARQ processes of an HARQ re-transmission protocol, wherein each HARQ process has an associated memory area for storing transmissions of a protocol data unit, the method comprising:
  receiving an initial transmission of a protocol data unit,
  storing the received initial transmission of the protocol data unit in one of a plurality of memory sub-areas into which the memory area associated to the one HARQ process is divided, wherein the one HARQ process is divided into a plurality of HARQ sub-processes, wherein each HARQ sub-process has one associated memory sub-area out of the plurality of memory sub-areas into which the memory area of the one HARQ process is divided,
  receiving a control information, associated to a re-transmission for the protocol data unit, and comprising a memory sub-area identifier, indicating the one of the memory sub-areas into which the initial transmission of the protocol data unit is stored, and
  storing the re-transmission for the protocol data unit in the memory sub-area indicated by the memory sub-area identifier of the received control information.

10. The method according to claim 9, wherein the protocol, data unit is a first protocol data unit and transmissions for a second protocol data unit, following the protocol data unit, are stored in a different memory sub-area than the one of the memory sub-areas into which the transmissions for the first protocol data unit are stored.

11. The method according to claim 10, wherein the different memory sub-area is selected based on control information, associated to an initial transmission of the second protocol data unit, or the different memory sub-area is the memory sub-area consecutive to the one of the memory sub-areas used for storing the transmissions for the first protocol data unit.

12. An apparatus for receiving protocol data units in a mobile communication system, wherein the protocol data units are received using one of a plurality of HARQ processes of an HARQ re-transmission protocol, wherein each HARQ process has an associated memory area for storing transmissions of a protocol data unit, the apparatus comprising:
  a memory area configured to store transmissions of a protocol data unit, associated with the one HARQ process, wherein the memory area of the one HARQ process is divided into a plurality of memory sub-areas, wherein the one HARQ process is divided into a plurality of HARQ sub-processes, wherein each of the HARQ sub-processes has one associated memory sub-area out of the plurality of memory sub-areas into which the memory area of the one HARQ process is divided,
  a receiver configured to receive an initial transmission of a protocol data unit,
  a processor configured to store the received protocol data unit in one of the plurality of memory sub-areas of the one HARQ process,
  wherein the one memory sub-area is selected based on control information associated to the initial transmission of the protocol data unit, or the one of the memory sub-areas for storing an initial transmission is selected among the plurality of memory sub-areas in a pre-determined way.

13. The apparatus according to claim 12, wherein the receiver is further configured to receive control information, associated to a re-transmission for the protocol data unit, and comprising a memory sub-area identifier, indicating the one of the memory sub-areas in which the initial transmission of the protocol data unit is stored, and
  wherein the processor is further configured to store the re-transmission for the protocol data unit in the one of the memory sub-areas indicated by the memory sub-area identifier of the received control information.

14. The apparatus according to claim 12, wherein the receiver is further configured to receive the control information, associated to the initial transmission of the protocol data unit, comprising a memory sub-area identifier, that is indicating the one of the memory sub-areas into which the initial transmission of the protocol data unit is to be stored.

15. An apparatus for receiving protocol data units in a mobile communication system, wherein the protocol data units are received using one of a plurality of HARQ processes of an HARQ re-transmission protocol, wherein each of the HARQ processes has an associated memory area for storing transmission of a protocol data unit, the apparatus comprising:
a memory area configured to store transmissions of a protocol data unit, associated with the one of the HARQ processes, wherein the memory area of the one of the HARQ processes is divided into a plurality of memory sub-areas, wherein the one of the HARQ processes is divided into a plurality of HARQ sub-processes, wherein each of the HARQ sub-processes has one associated memory sub-area out of the plurality of memory sub-areas into which the memory area of the one of the HARQ processes is divided,
a receiver configured to receive an initial transmission of a protocol data unit,
a processor configured to store the received protocol data unit in one of the plurality of memory sub-areas of the one HARQ process,
wherein the receiver is further adapted configured to receive control information, associated to a re-transmission for the protocol data unit, and comprising a memory sub-area identifier, indicating the one of the memory sub-areas in which the initial transmission of the protocol data unit is stored, and
wherein the processor is further configured to store the re-transmission for the protocol data unit in the one of the memory sub-areas indicated by the memory sub-area identifier of the received control information.

16. The apparatus according to claim 15, wherein the memory area of the HARQ protocol is divided among a pre-determined number of HARQ processes, and wherein an additional memory area is reserved for receiving the protocol data units that are persistently scheduled.

17. The apparatus according to claim 15, wherein persistent scheduling is used for transmitting and receiving the protocol data units, and the transmitting entity selects the one of the HARQ processes for transmitting and receiving the persistently scheduled protocol data units among the plurality of HARQ processes of the HARQ protocol,
wherein the receiver is adapted configured to receive information about the selected one of the HARQ processes, within a configuration message for configuring the one of the HARQ processes for use with persistent scheduling, or within control information for activating the HARQ process for use with persistent scheduling.

18. An apparatus for transmitting protocol data units in a mobile communication system, wherein the protocol data units are received using one of a plurality of HARQ processes of an HARQ re-transmission protocol, wherein each of the HARQ processes has an associated memory area for storing transmissions of a protocol data unit, the apparatus comprising:
a memory area associated with the one of the HARQ processes adapted configured to store transmissions of a protocol data unit,
a transmitter configured to transmit an initial transmission of the protocol data unit, wherein the receiving entity uses an HARQ process to receive and store the transmissions for the protocol data unit, and the one of the HARQ processes of the receiving entity is divided into a plurality of HARQ sub-processes, wherein each of the HARQ sub-processes has one associated memory sub-area out of a plurality of memory sub-areas into which the memory area associated with the receiving entity's HARQ process is divided,
a processor configured to store the transmitted protocol data unit into the memory area of the one of the HARQ processes,
the transmitter being further configured to transmit control information to the receiving entity for re-transmissions for the protocol data unit, comprising a memory sub-area identifier, indicating the one of the memory sub-areas of the receiver's HARQ process into which the initial transmission of the protocol data unit is stored.

19. The apparatus according to claim 18, wherein the processor is configured to determine the one of the memory sub-areas of the receiver's HARQ process into which the initial transmission of the protocol data unit is stored based on a pre-determined way the receiving entity selects the one of the memory sub-areas for storing the transmissions of the protocol data unit.

20. The apparatus according to claim 18, wherein the memory area associated with the one of the HARQ processes is divided into a plurality of memory sub-areas each for storing the transmissions for a particular protocol data unit.

* * * * *